United States Patent [19]

Dupree et al.

[11] 4,074,273
[45] Feb. 14, 1978

[54] SEQUENTIAL VALUE MULTI-POINT RECORDING DEVICE WITH UNIDIRECTIONAL SCAN

[75] Inventors: Wayne P. Dupree; William F. Brown, Jr., both of Midland, Mich.

[73] Assignee: The Dow Chemical Company, Midland, Mich.

[21] Appl. No.: 731,239

[22] Filed: Oct. 12, 1976

[51] Int. Cl.² .................................................. G01D 9/38
[52] U.S. Cl. ........................................ 346/34; 346/62
[58] Field of Search ........................ 346/34, 45, 62, 64

[56] References Cited

U.S. PATENT DOCUMENTS

| 3,553,712 | 1/1971 | MacMullan et al. | 346/34 |
| 3,665,414 | 5/1972 | Hutch et al. | 346/34 X |
| 3,840,878 | 10/1974 | Houston et al. | 346/62 |
| 3,949,408 | 4/1976 | Mason et al. | 346/34 X |

*Primary Examiner*—George H. Miller, Jr.
*Attorney, Agent, or Firm*—Nis H. Juhl

[57] ABSTRACT

A method and an apparatus are taught in which variable analog data, representative of a plurality of physical parameters are recorded on a thermo-sensitive recording paper which is movable along an axis representative of time. A thermal recording head is transversely movable over the recording paper for sequentially recording the variable analog data in their order of value in a unidirectional sweep of the recording head over the paper. The variable analog data signals arriving in the recorder are updated to obtain their instantaneous values and are gathered and transferred to memory locations in a sequential order. The sequential analog data is then tabulated in the order of value in an ascending or declining magnitude and recorded in such order on the recording paper. Successive recordings of tabulated analog values provide tracings on the recording paper giving, in graphic form, a continuous read-out of physical parameters. The recording head conducts successive unidirectional sweeps over the paper to form the tracings of physical parameters.

23 Claims, 3 Drawing Figures

SEQUENTIAL VALUE MULTI-POINT RECORDING DEVICE WITH UNIDIRECTIONAL SCAN

BACKGROUND OF THE INVENTION

The present invention relates to an improved process for recording variable analog data representative of a plurality of physical parameters and to a sequential value multi-point recorder for recording such physical parameters in the form of continuous tracings on a recording paper.

Heretofore, multi-point recorders have been provided which are adapted to print a plurality of variable physical parameters on a chart. Such multi-record printing may be accomplished by use of a print wheel that is indexed for each measurement to bring into printing relation with the chart a type character selected to identify the variable being recorded. The print wheel is moved to a position along the chart corresponding to the instantaneous value of the variable being recorded and then is pressed thereagainst momentarily.

Each of the typed characters is made of a different form than the other characters. In some uses of the recorder, a single color is made use of, and in others, if desired, each character is printed in a different colored ink.

Such recorders may include an ink wheel pad or ribbon for inking the type characters on the type of print wheel. Such inking systems allow a single recording instrument to print in different colors for different characters to be employed. With this system, each type character is synchronized with the inking system so that each time a type character is selected, the proper color is also selected.

Such multi-record printing instruments generally provide for a measuring and print wheel balancing circuit comprising a plurality of separate transducers or thermo-couples each of which is employed to sense the magnitude of a variable condition under measurement such as temperature, pressure, voltage, or the like. A selector switch is provided to selectively cut in each input from the transducer or thermo-couples with a null balancing circuit which contains a balancing motor for driving the print wheel across the chart to a balanced position. When the print wheel is in this position, the magnitude of each of the variables under measurement in identifiable characteristic form can be separately printed on the chart by means of a print wheel cam-actuating printer mechanism.

A typical multi-record printing recorder of the construction described above is disclosed in U.S. Pat. No. 3,216,015 and requires that the balancing motor must move the printing wheel back and forth across the chart each time it senses the magnitude of a variable condition. This reciprocating movement of the printing wheel for printing each variable condition on the chart is time consuming, especially where it is desired to record a multiplicity of variable conditions. Additionally, such recorder systems are subject to a great amount of wear and tear in view of the constant movement of the recorder components including the multipoint contact switch; balancing motor; slide wire and contactor systems, and print wheel, for example. Thus, recorder systems of this nature do not have the desired reliability and require a high degree of maintenance to maintain all moving components in continuous operating condition over long periods of time.

In contrast to the multi-point recorder system disclosed in the above described U.S. Pat. No. 3,216,015, variable multi-point recorders have been provided which are adapted to produce recordings of a plurality of variable physical phenomena by sequentially scanning a plurality of input circuits and then producing indicia representative of the measured variable values. In that manner, a separate trace, usually a series of dots, is produced for each of the input signals, each trace being representative of a physical phenomena such as temperature, pressure, or the like. In these prior art recorders, a series of timed pulses is generated for controlling the recorder operation by employing a constant speed timing motor to drive a rotary switching arrangement. Here, the constant speed of the timing motor necessarily fixes the length of the recording cycle for each of the input points. Representative of such multi-point recorders is U.S. Pat. No. 3,576,582, issued on Apr. 27, 1971 to R. T. Smith, Jr. Here too, an excessive amount of time is expended in reciprocating a movable printing carriage across a recording sheet member for printing upon the sheet member a plurality of record traces to correspond to several input signals sensed. Thus, the time of producing indicia representative of a pluraltiy of measured variable values and printing them on the chart in a random fashion by value is excessive. Additionally, wear and tear of the constantly moving recorder components demand constant attention and maintenance.

An improvement in the multiple point recorder of U.S. Pat. No. 3,576,582 was obtained with the multiple point recorder described in U.S. Pat. No. 3,665,414, issued on May 23, 1972 to Fredrick S. Hutch, et al. In this recorder, the need for a timing motor was eliminated and by employing digital techniques, a more versatile means for programming the recorder operation was obtained. With the digital programming the speed of the recorder operation depends on the base frequency of the clock signal. Here too, however, the sequential scanning of the plurality of input circuits for producing indicia representative of the measured variable data values requires excessive movement of the print head in printing each variable value on the recording chart. Thus, the print head is still being directed to print out the measured variable values not in accordance with the magnitude of the variable valves but in accordance with the sequence in which the plurality of input circuits are scanned. Thus, in effect, the print head moves in a random fashion over the recording chart to print out each variable value each time a scanning function of the plurality input circuits is performed.

A further improvement in multi-point recording systems was achieved with the introduction of non-impact type printing heads. Visual information such as alphanumeric characters or other symbols previously involved the use of printing types in the form of pins, or the like, which are pressed against the recording paper with a carbon tape, or the like, interposed therebetween to thereby impress the recording paper with the shapes of the printing types or the pins. Such systems are commonly referred to as "Impact Printers" and have been widely used because of their merit in obtaining high definition of the printing, availability of any desired shape of printed character, useability of ordinary paper for the recording paper, and freedom of the recorded information from aging. However, such mechanical print heads produce a considerable noise due to the impact of the printing types during impression. Additionally, the numerous mechanically movable parts of the print head mechanism are subject to considerable wear and tear during their uninterrupted use in printing information, such as variable values, on the recording paper. Such electro-mechanical print head mechanisms must be continuously monitored and serviced by skilled maintenance personnel to maintain the equipment in working order.

A solution to the problems inherent in electromechanical print heads became available with the introduction of thermal print heads used in combination with thermal-sensitive recording paper. Such thermal print heads utilize a plurality of thermal segments which are selectively caused to generate heat to thereby provide any desired pattern on the thermal-sensitive paper. Such thermal print heads have the advantage of eliminating the mechanical printing components used in prior electro-mechanical print heads and permit the introduction of more reliable electrical controls. An example of the use of a thermal print head in a recording device is represented by U.S. Pat. No. 3,754,279 which issued on Aug. 21, 1973 to Leo F. Valenti, et al.

Another example of a recording apparatus of the non-impact type is disclosed in U.S. Pat. No. 3,855,448 which issued on Dec. 17, 1974 to Takayoshi Hanagata, et al. In this non-impact type system, a plurality of heating segments on a thermal print head are generally disposed in a common plane and can be heated separately and selectively. The system employs a heat-sensitive print member composed of a heat-resistant back-up layer and a thin film of an adhesive resin of low melting point disposed over the back-up layer, and also employs a web of recording paper free of any thermal sensitive material. When the thermal print head and the recording paper are moved relative to each other in one direction, the print member is brought into intimate contact with both of the thermal print head and the recording paper. In such position, the islands in the thermal print head may be selectively energized to melt the adhesive resin in the resin film and transfer the molten resin to the recording paper, thus accomplishing a print on the recording paper.

Another thermal printing technique is disclosed in U.S. Pat. No. 3,840,878 issued on Oct. 8, 1974 to David T. Houston, et al.

SUMMARY OF THE INVENTION

The recording process and apparatus, as embodied in the present invention, provides for a sequential value multi-point recorder in which variable analog data, representative of a plurality of physical parameters such as temperature, pressure, or the like, are updated to obtain an instantaneous value of such physical parameters. The updated variable analog data is gathered by analog to digital converters and transferred and stored in memory locations in a squential order. The stored analog data is subsequently tabulated in their order of ascending or declining magnitude. The tabulated analog data is sequentially recorded on a heat-sensitive recording sheet material which is continuously movable along an axis representative of time, by a thermal print head during a unidirectional sweeping movement of the print head over the sheet material along a variable analog data axis.

It is a primary object of the present invention to record all selected variable analog data in their order of magnitude, on a moving sheet material by movement of the recording head in a single unidirectional sweep over the sheet material.

Another object of the invention resides in the recordal of a plurality of tracings on the recording paper in which the tracings are representative of physical parameters recorded on the paper as a function of time.

A further object of the invention resides in the recordal of intelligence on thermo-sensitive recording paper with a thermal recording head controlled by a digital programmer and motor and printer control logic.

It is also an object of the invention to scale variable analog data according to predetermined mathematical functions and tabulating such data in their order of magnitude.

It is another object of the invention to provide additional alpha and/or numerical indicia on the moving sheet material for marking variable analog data on said sheet material at predetermined intervals.

It is a further object of the invention to manually select desired variable analog data and to record such data on the moving sheet material.

It is also an object of the invention to manually change the scaling of selected variable analog data according to a mathematical function.

It is also an object of the invention to monitor and mark on said recording paper a "0" percent marginal position and a select second percentage position for continuously monitoring of recorder calibration.

Figure 1:
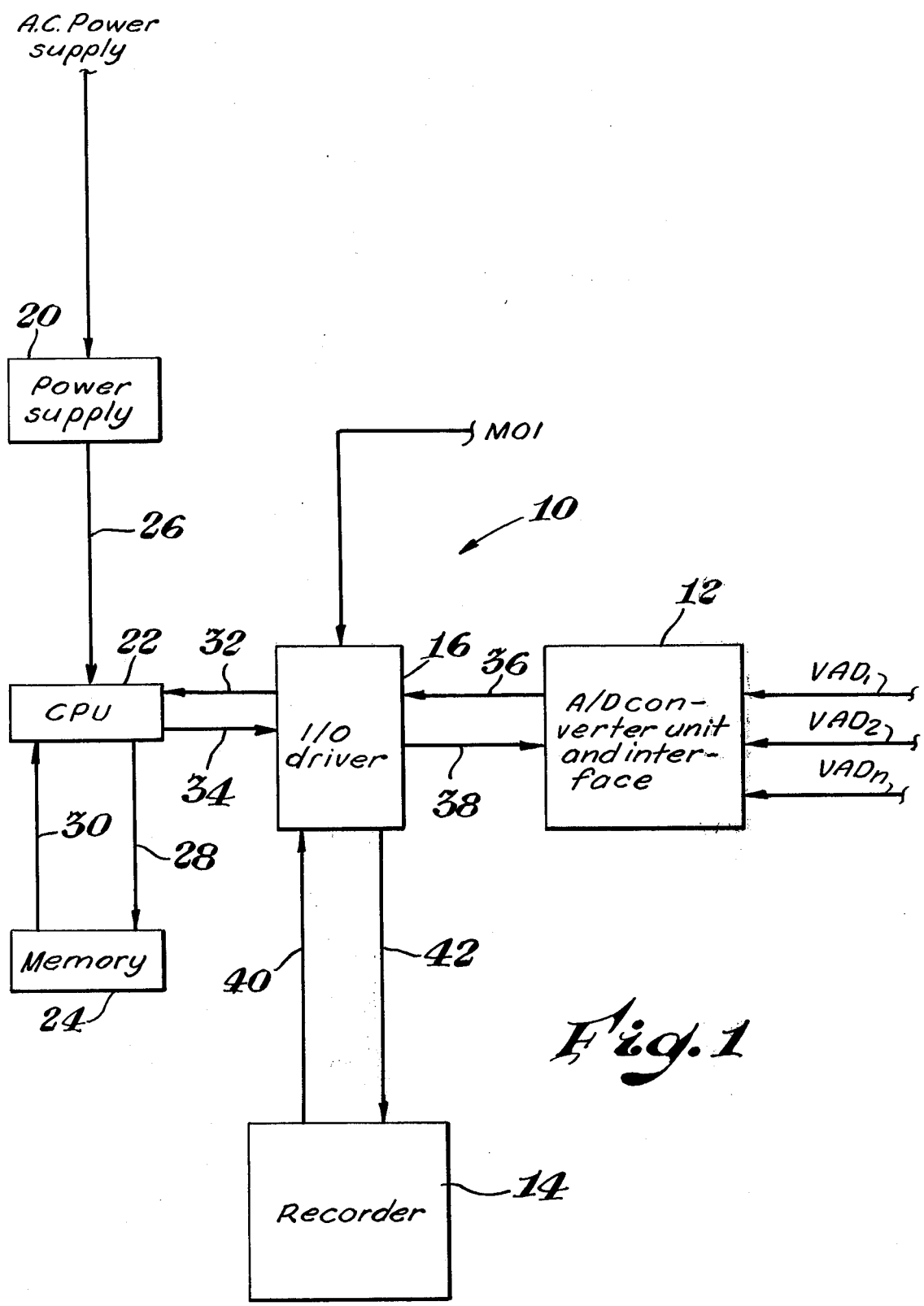
FIG. 1 is a block diagram of a solid-state electronic digital programmer and sequential value multi-point recorder.

Referring now to FIG. 1, there is illustrated in diagrammatic form, a solid-state electronic digital programmer or microprocessor, generally identified by reference number 10, connected to a multi-point recorder 14. The programmer comprises a central power supply 20 which can be connected to a 110 volts alternating current outlet. The power supply 20 includes a rectifier (not shown) for converting the alternating current to direct current voltages desired for operating the components of the programmer and the recorder. The power supply is connected by power supply line 26 to a CPU or central processing unit 22 which, in turn, is connected to a memory circuit 24 by storage signal input leads 28 and output leads 30. Although the drawings illustrate the various components of the programmer and recorder as being connected by single input or output electrically conducting line, it will be understood that each line may be representative of a plurality of leads capable of conducting the desired programming functions.

The power supply 20; CPU 22, and memory circuit 24 will not be described in detail as they are of conventional construction and commercially available either individually or as a combined unit. The central processing unit with the power supply is a component generally designated 10018-08J alpha-16 and 11204-07PFR/RTC/TTY. The memory circuit 24 is generally designated by component number 11244-08 and consists of an 8K-16 bit: read/write core memory. The described components are marketed under the specified designations by Computer Automation Inc.

CPU 22 is connected by input leads 32 and output leads 34 to an input/output or I/O driver 16 which is commercially available from Computer Automation Inc. under designation 1322-00 I/O drive module.

The I/O driver 16 is connected to an analog to digital converter unit and interface or A/D converter 12 by input leads 36 and output leads 38. The A/D converter is a commercial item marketed by Zeltex Inc. under designation ZD461 and will therefore not be described in detail. The A/D converter 12 receives variable analog data signals representative of physical parameters such as temperature, pressure, voltage, or the like, through a plurality of input leads designated $VAD_1$; $VAD_2$ and $VAD_n$. The number of input leads depend on the number of physical parameters to be sensed and recorded. Accordingly, the last lead designation $VAD_n$, with the subscript $n$, is indicative of any select number of leads.

A manual operator interface is connected to the I/O driver through input leads designated MOI. The I/O driver is connected to the recorder 14 through input leads 40 and output leads 42.

In the operation of the multi-point recorder, the variable analog data signals $VAD_1$; $VAD_2$ and $VAD_n$ are received and converted in a plurality of electronic converters (not shown) in the A/D converter 12. Conversion of the variable analog data signals is initiated in CPU 22 which conducts an output control demand signal through output leads 34 to read select variable analog data stored in the A/D converter 12. A selected variable analog data signal in the form of a data word consisting of a plurality of data bits is transferred by CPU 22 to a specific location in memory circuit 24. The selected analog data is transmitted to the memory circuit 24 through input leads 28. All other data signals entering the A/D converter 12 are sequentially read by CPU 22 and stored in the memory circuit 24.

The variable analog data signals may be scaled according to a select mathematical function, such as multiplication, division, logarithmic function, curve matching, or the like. The stored data words or bits from the memory circuit 24 are in accordance with the invention tabulated as a function of time by CPU 22 and again stored in the memory circuit 24 in their order of magnitude. CPU 22 also determines which data words will be marked and recorded by the recorder 14 with numerical identification indicia, and stores this information in memory circuit 24 as part of the stored tabulated data word. Each selected and tabulated data word which now contains the information consisting of the numerical identification indicia and time to mark the variable analog data, is transferred from the memory circuit 24 to the recorder 14 where the variable analog data is recorded. The recorder 14 is substantially of standard construction and comprises a thermal print head 50 operable in combination with a heat-sensitive recording paper 57. The recording paper is movable along an axis representative of time so that each signal representative of an instantaneous value representative of a physical parameter is marked and recorded on the recording paper when the thermal print head passes that point on the recording paper which corresponds to a percentage of that instantaneous value. The recording head is capable of recording the instantaneous values in tabulated form and in their order of magnitude in a single unidirectional sweep of the recording head over the recording paper. Since the signals are in their order of magnitude, the print head need not conduct a plurality of directional reversals in a single sweep over the paper in order to mark the tabulated variable analog data on the recording paper.

Figure 2:
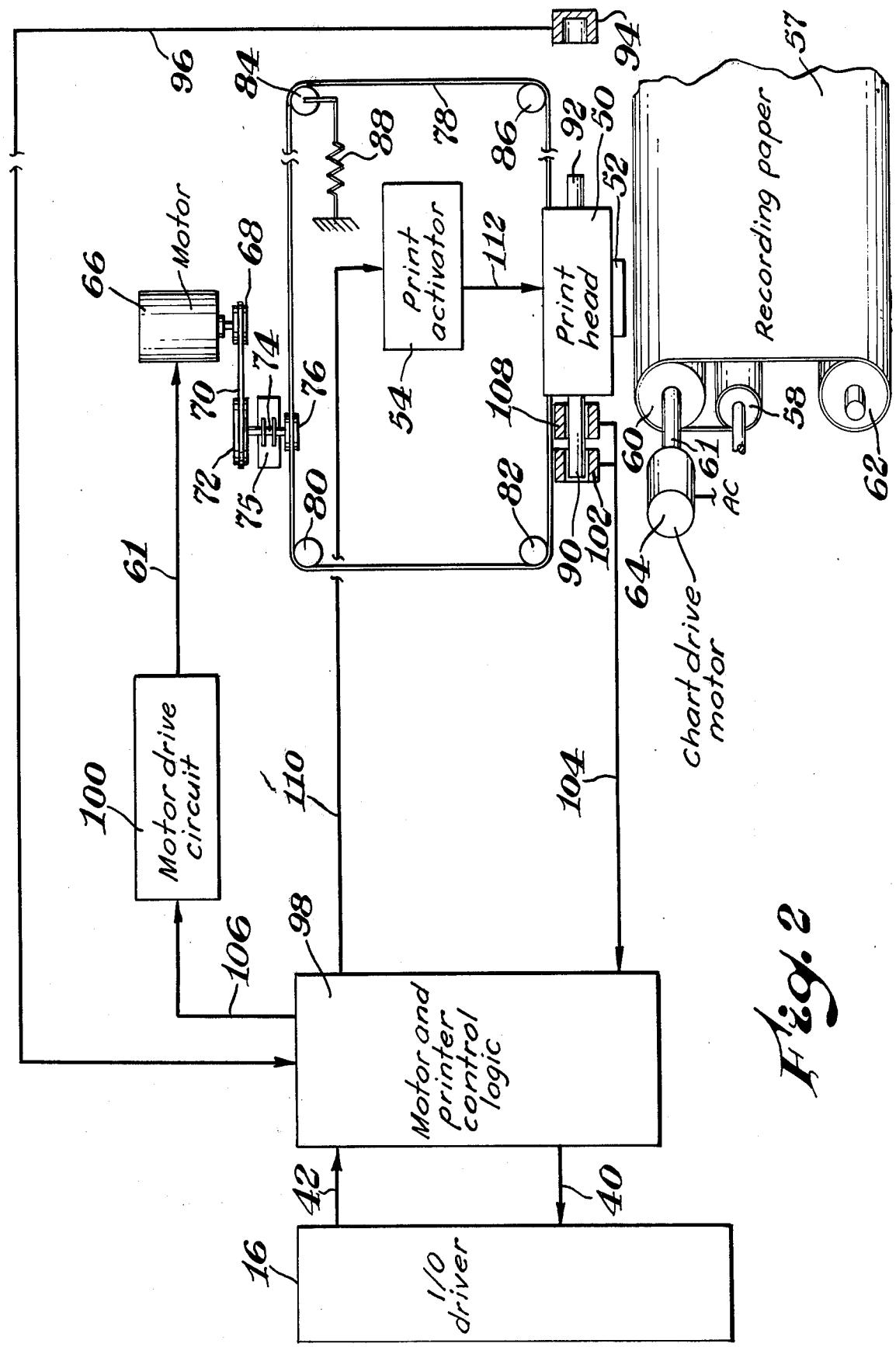
FIG. 2 is a more detailed block diagram of the recorder and electronic control logic for controlling the recorder.

The recorder 14 is schematically illustrated in greater detail in FIG. 2 and comprises the thermal print head 50 having a plurality of electrical heating elements 52 which are selectively energizable by a print actuator 54 which is under the control of a motor and printer control logic circuit 98. The thermal print head 50 may be constructed of a type in which the heating elements 52 are arranged in a single row or column, or in a matrix forming a plurality of rows and columns.

The print head 50 of the present invention is preferably provided with a plurality of thermally independent heating elements which are arranged in a single column and which are selectively energizable by the print actuator 54 to mark the data to be recorded in a series of indicia, such as small dots, or the like, on the moving recording paper. The heating elements 52 are also adapted to provide alpha or numeric data at desired locations on the recording paper identifying, for example, individual tracings formed by successive data markings. Numeric data may also be provided at spaced intervals on the recording paper to indicate "Time" or alpha-numeric intelligence indicia indicative of processing data such as "Low Temperature-50° C"; "High Voltage-130V"; "Flow Rate-20GPM," or the like.

A supply roll 58 of a thermo-sensitive recording paper 57 is rotatably mounted in a frame (not shown) of the recorder. The recording paper is trained over a drive roll 60 which is rotatably journaled in the frame and connected by a drive shaft 61 to a chart drive motor 64. The recording paper is wound up by a take-up roll 62 which is rotatably mounted in the frame. The guide and take-up rolls 60, 62 are connected by a chain and sprocket or cable drive (not shown).

Driving movement of the print head 50 over the recording paper in a direction transverse to the movement of the recording paper is provided by a print head driving mechanism comprising a drive motor 66 having a drive sprocket or pulley 68 secured to a drive shaft of the motor. A driven sprocket 72 of a larger diameter than the driving sprocket 68 is mounted at one end of a rotatable shaft 74 which is rotatably mounted on a fixed support 75 provided in the recorder frame. A drive chain or cable 70 extends between the sprockets 68 and 72 for driving the driven sprocket 72 at a predetermined lower speed of rotation. A second driving sprocket 76 is mounted at the opposite end of the rotatable shaft 74 for driving a chain or cable 78 which is in meshing engagement with or entrained around the second sprocket 76. The cable 78 is trained around idler wheels 80, 82, 84 and 86 and connected to opposite sides of the print head 50 for moving the print head in opposite directions between a lower pair of the idler wheels 82 and 86. Any one of the idler wheels such as, for example, the wheel 84 may be movably mounted with respect to the recorder frame. A tensioning mechanism 88 such as a tension spring is fixedly mounted at one end to the frame and at the other end to a wheel bracket (not shown) for the movable idler wheel 84 for applying a constant tension to the belt 78. Other types of belt tensioning devices such as a threaded bolt and sleeve may be used instead of a spring to provide the desired amount of tension on the belt.

The print head 50 is generally provided with a plurality of bearing sleeves (not shown) which are slidably movable along a single smooth surfaced rod or a pair of parallel rods (not shown) mounted in the frame of the recorder. The print head driving mechanism is of a simple yet highly efficient construction since intermeshing components are avoided to provide a substantially frictionless or impact free mechanism which is trouble free over long periods of time requiring little, if any, maintenance or repair.

In practice, the thermal elements 52 of the print head 50 are in sliding engagement with the recording paper. The contact is such that excessive frictional contact between the thermal elements and the recording paper is avoided. Contact is sufficient, however, to provide legible markings on the recording paper when select thermal elements are energized. For optimum recording it is therefore desirable to maintain the energizable thermal elements in a position to avoid excessive frictional drag and yet close enough to the recording paper to provide clear markings on the thermo-sensitive recording paper.

The print head is provided with actuating rods 90 and 92 extending outwardly from opposite sides of the print head. Movement of the printing head transversely over the recording paper in one direction causes the actuating rod 92 to activate a right hand margin detector 94 positioned adjacent an extreme right hand margin of the recording paper. Upon registration of the actuating rod 92 with the right hand margin detector 94, the detector sends a command signal through leads 96 to the motor and printer control logic 98 which directs a command signal through leads 106 to a motor drive circuit 100 for reversing the direction of rotation of the motor 66 at the instant the print head reaches the extreme right hand marginal position on the recording paper. Actual reversal in the direction of print head movement is accomplished by an on/off relay (not shown) provided in the motor drive circuit. The control logic 98 also sends a command signal to the I/O driver 16 and CPU 22 whereby arrival of the print head 50 at the extreme right marginal position within a predetermined time frame is verified by CPU 22. Failure of the print head to reach the right marginal position within the specified time frame activates CPU 22, directing a command signal to the control logic 98 and motor drive circuit 100 to return the print head 50 to a left marginal starting position for repetition of the cycle.

The actuating rod or tab 90 at the left hand side of the print head 50 is adapted to activate a left hand margin detector 102 positioned at the extreme left hand margin of the recording paper. A left hand margin command signal is conducted through leads 104 to the control logic 98 which conducts a command signal through leads 106 to the motor drive circuit 100 and to the motor 66 through the leads 61 to deactivate the motor 66 when the print head 50 is in the extreme left hand marginal position of the recording paper.

On arrival of the print head at the left hand marginal position, the control logic 98 sends a command signal to the I/O driver 16 and CPU 22. Arrival of the print head at the extreme left marginal position is verified by CPU 22 which conducts a chain of command signals to the I/O driver and control logic to energize motor 66 and commence driving movement of the print head towards the right margin. The drive motor 66 is preferably a stepping motor which is continuously energized to drive the print head unidirectionally over the recording paper in a single sweep. Unidirectional movement of the print head over the recording paper here signifies movement of the print head in one direction only during a sweep of the print head from one marginal position towards the opposite marginal position. The stepping motor 66 can also be controlled by CPU 22, control logic 98 and motor control circuit 100 to digitally step the motor to drive the print head to any desired position between the extreme marginal positions of the recording paper for marking the paper at that predetermined position.

Prior to marking of the variable analog data on the recording paper, the print head is indexed with respect to a "0" marginal position on the recording paper. A command signal from a "0" position detector 108, through leads 104, is conducted to the control logic 98 at the instant the actuating rod 90 reaches a position with respect to the detector 108 signifying a "0" reference position of the print head. Control logic 98 again sends a command signal to the I/O driver 16 and to CPU 22 verifying arrival of the print head at the "0" marginal position. At that instant, a thermal heating element 52 is energized by a command signal from CPU 22 to provide an indicia or mark on the "0" reference line of the recording paper. The command signal from CPU 22 is conducted through the I/O driver 16 to the motor and printer control logic 98. An identifying circuit may be provided in the control logic 98 to identify a particular motor and printer control logic where a plurality of recorders are controlled by the CPU 22 and I/O driver. Such a system may be used in recording a plurality of physical systems such as, for example, in the manufacture of different manufacturing products or the recordal of different industrial processes. The control logic generally comprises a circuit with a selector switch for determining the selection of a column of heating elements on the print head to be activated when a multiple column or, matrix type thermal print head is used. A command signal indicative of the selected column is conducted from the control logic through leads 110 to the print activator 54. A command signal indicative of a selected row or rows of thermal elements to be energized is also conducted from CPU 22 to the I/O driver 16 and control logic 98 through leads 110 to the print activator 54. The command signals to the print activator are amplified and transmitted from the print activator through leads 112 to the print head for energizing the thermo elements in selected rows and columns for marking the recording paper. A detailed description and circuit drawing of digital logic circuits for the control logic and print activator is not being presented here as persons skilled in the art will readily recognize that various alternative logic circuits for accomplishing the desired results can be designed. The print head now proceeds to move in its unidirectional sweep towards the right marginal position of the recording paper for successively marking, on command by CPU 22, all of the selected variable analog data on the recording paper, in their order of magnitude and without conducting a reversal in the direction of movement of the print head in its sweeping movement over the recording paper. The print head on reaching the right marginal position, again activates the right margin detector 94 for repeating the cycle by returning the print head 50 to the left marginal position.

Although not illustrated in FIG. 2, the recorder can be adapted for recording of the print head during sweeping movements of the print head in opposite directions, that is, in a forward as well as reverse direction. In that mode of operation, the print head would be directed to mark the recording paper not only in its sweep over the paper from a "0" to a "100" marginal position, but also in a reverse direction from a "100" to a "0" marginal position. This operational modification can be obtained by providing an additional "100" position detector (not shown) adjacent to the right margin detector 94. This operational modification would also require a modification in the programming of memory circuits to provide for a read-out of the tabulated variable analog data stored in the memory circuit 24 in a reverse order. Additional modifications in the control logic 98 would provide a command signal to the motor drive circuit 100 to deactivate the motor 66 when the print head 50 reaches the extreme right marginal position of the recording paper. More specifically, deactivation of the motor 66 is obtained when the activating rod 92 activates the right hand margin detector 94.

Figure 3:
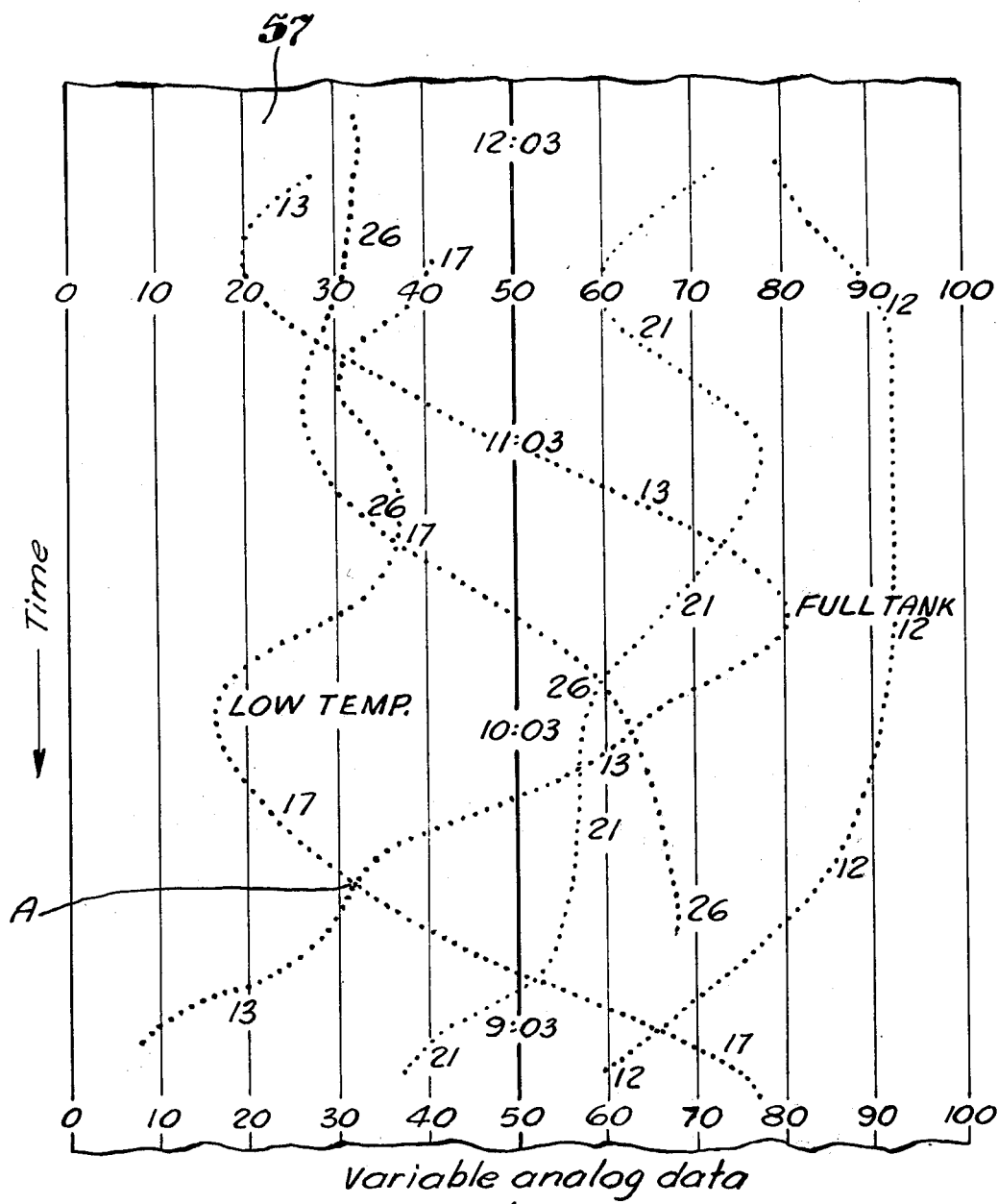
FIG. 3 is a section of recording paper showing a plurality of tracings representative of physical parameters and other alpha-numeric data recorded on the paper.

A typical printout is illustrated in FIG. 3, showing a section of the recording paper 57 which is driven at a constant speed and in a downward direction, as indicated by the arrow to provide, in effect, vertical movement of the recording paper as a function of time. It is apparent that the recording of variable analog data, as a function of time, can be conducted not only on a vertically or horizontally movable recording paper, but also on recording paper which may be movable in either direction along vertical or horizontal axes. In practice, the recording paper is divided, on a longitudinal axis, into equi-distantly spaced lines representing 0 to 100 percent values and also representing the variable analog data axis. Stated another way, in a sweep of the recording head over the recording paper, a thermal element on the print head will be energized at the instant it reaches the "0" percent reference line to place a mark on the "0" line. The thermal element will successively be energized in positions representative of the tabulated variable analog signals from the memory circuit 24 to mark the recording paper at successive positions on the recording paper corresponding to a percentage value of the tabulated data in the order of their magnitude. In successive sweeps of the recording head over the recording paper a plurality of tracings are formed such as the tracings which have been identified by the print head with numerical indicia 13, 17, etc. With the recording head conducting successive sweeps over the recording paper a plurality of first markings are therefore placed on the paper to form tracing 13. A plurality of second markings placed on the paper will form tracing 21, etc. It will be noted, however, that the tabulated values may change in their order of magnitude such that the tracings may intersect as, for example, at a point indicated by reference letter A showing an intersection between tracings 13 and 17. Immediately following intersection at point A, the variable analog data forming tracing 17 is tabulated in an order preceding that of tracing 13 and therefore marked in a new order of ascending value. Although this procedure has only been described with respect to two intersecting tracings such as 13 and 17, it will be understood that the same procedure is carried out with respect to all intersecting tracings.

It will be seen that successive sweeps of the recording head may provide any number of tracings representative of varied physical parameters. Successive sweeps of the recording head may also provide tracings representative of calculated mathematical functions such as, for example, the linearization of flow rates, multiplication of functions, or energy input per unit time.

At each sweep of the recording head over the recording paper, an indexing mark may also be provided at any point between the "0" and "100" percent lines on the recording paper. An indexing mark, as illustrated in FIG. 3, has been placed on the more heavily marked 50 percent line. Any deviation of this indexing mark to the left or to the right of the 50 percent line will provide the operator with a readily visualized indication of a malfunctioning of the print head, recording paper or of CPU 22. Adjustments can therefore readily be effected.

At periodic intervals, numerical indicia is marked along the side of the tracings to identify the particular physical parameter being recorded. The thermal elements 52 on the print head 50 are periodically activated to provide the numerical indicia 13, 21, 12, etc. The thermal elements on the print head may also be activated at predetermined time intervals to provide a "Time" mark, here shown along the 50 percent line. "Time" markings may be provided at any select time intervals and are here shown over a three hour period of time between 9:03 A.M. to 12:03 P.M.

Desired alphabetical markings may also be provided at select positions adjacent to the tracings designated high or low values in the physical parameters being recorded. As illustrated, tracing 17 has been provided with an alphabetical marking indicative of the "Low Temp" of the physical parameter being recorded, while tracing 13 has been identified with an alphabetical marking to signify a "Full Tank" condition.

From the foregoing description, it will be apparent that the sequential value multi-point recorder of the present invention is capable of providing a multiplicity of tracings on the thermo-sensitive recording paper with each tracing being indicative of a particular physical parameter. The thermal recording head is activated, on command, to provide intelligence information markings on the recording paper in a continuous unidirectional sweep of the recording head between marginal positions of the recording paper. Intelligence information may include selected variable analog data and/or selected mathematical functions arranged in their order of value as well as alpha-numeric data. Movements of the recording paper at a predetermined speed along a longitudinal axis of the paper and successive transverse sweeping movements of the recording head between marginal positions of the recording paper provide a tracing of the physical parameters to be recorded with respect to time.

We claim:
1. In a process for recording variable analog data representative of physical parameters on a sheet material with a recording head which is moveable relative to said sheet material, comprising the step of retrieving and storing said variable analog data, tabulating said variable analog data in order of value, and marking said tabulated analog data on said sheet material, the improvement comprising the steps of driving said recording head in a unidirectional movement and in a continuous sweep over the sheet material, sequentially marking, as a function of time, said tabulated data at their value and representative of said physical parameters and in their order of magnitude on said sheet material, and continuously moving said sheet material, as a function of time, in a transverse direction relative to said recording head.

2. In the process of claim 1, including the step of scaling said variable analog data according to a predetermined mathematical function subsequent to tabulation of said analog data.

3. In the process of claim 1, including the step of manually changing the scaling of select variable analog data according to a mathematical function.

4. In the process of claim 1, including the step of manually selecting desired variable analog data and for manually scaling said selected data to be marked on the sheet material according to a mathematical function.

5. In the process of claim 1, including the step of marking alpha-numerical indicia at predetermined intervals on said sheet material.

6. In the process of claim 1, including the step of recording said variable analog data on a thermo-sensitive recording paper with a thermal print head.

7. In the process of claim 6, including the step of continuously monitoring and marking on said recording paper a "0" percent marginal position and a select second percentage position for continuous monitoring of recorder calibration.

8. The process of claim 7, including the step of scaling said variable analog data after storing in said memory locations to a predetermined mathematical function.

9. A process for recording variable analog data representing physical parameters on a heat-sensitive, recording sheet material with a thermal print head, comprising the steps of continuously moving said sheet material, as a function of time and in a direction transverse to said print head, updating said variable analog data to obtain an instantaneous value of the physical parameters, gathering said updated variable analog data in analog to digital converters, transferring said updated variable analog data from predetermined order, tabulating said variable analog data in a memory location in order of magnitude, varifying the print head location by means of a margin detector for determining the location of said print head with respect to a marginal position of said sheet material, activating said print head for unidirectional movement and in a continuous sweep over the sheet material, monitoring a starting position for recording of said variable analog data on said sheet material as the print head commences such unidirectional movement over said sheet material, activating thermal elements on said print head, as a function of time, during sweeping movement of said print head over the continuously moving sheet material to record in a sequential and in an ascending or descending order said variable analog data representing a plurality of physical parameters, and monitoring the thermal position of the print head at the opposite margin of said sheet material on completion of the sweeping movement for terminating the printing operation.

10. The process of claim 9, including the step of selectively recording on said sheet material alpha or numerical indicia representative of said variable analog data.

11. The process of claim 9, including the step of selectively recording on said sheet material alpha or numerical indicia representative of said variable analog data at predetermined locations corresponding to the value of said variable analog data.

12. The process of claim 9, including the step of periodically recording on said sheet material chronological data in addition to said variable analog data.

13. The process of claim 9, including the step of continuously monitoring and marking on said recording paper a "0" percent marginal position and a select second percentage position for continuously monitoring of recorder calibration.

14. In a sequential value multi-point recorder for recording variable analog data on a sheet material with a recording head which is transversely movable relative to said sheet material comprising, solid-state electronic digital programming means operable to sense input signals representative of said variable analog data in a sequential order, said programming means including a central processing unit for storing said variable analog data in a predetermined order in a memory circuit, said central processing unit subsequently tabulating said stored variable analog data in order of value and storing said tabulated variable analog data in said memory circuit, the improvement comprising an input/output driver for driving said recording head in a unidirectional movement and in a continuous sweep over the sheet material for sequentially marking, as a function of time, said tabulated variable analog data in said order of value on said sheet material, and means for continuously moving said sheet material, as a function of time, in a direction transverse to said recording head.

15. In the recorder of claim 14, including an analog to digital converter unit and interface connected to said input/output driver, said analog data converter unit being connected to sensing units for sensing said variable analog data representing physical parameters, said converter unit storing said variable analog data to be read by said input/output driver on demand by the central processing unit.

16. In the recorder of claim 14, wherein said central processing unit scales said variable analog data according to a predetermined mathematical function, and subsequently tabulating said scaled data in said memory circuit.

17. In the recorder of claim 14, including a manual operator interface for manually selecting desired variable analog data and for manually scaling said selected variable analog data according to a mathematical function, and subsequently tabulating said scaled data by order of magnitude in said memory unit.

18. In the recorder of claim 14, including first sensing means for sensing the position of the print head in a "0" percent marginal position and for activating on command by said central processing unit print head to mark the sheet material at said "0" percent position, and at a select second percentage position for continuous monitoring of recorder calibration.

19. A sequential value multi-point recorder for recording variable analog data on a heat sensitive recording sheet material comprising, a thermal print head, a motor drive circuit connected to a print head motor for moving the print head unidirectional and in a continuous sweep across the sheet material between "0" and "100" percent marginal positions on the sheet material, first sensing means for sensing the position of the print head in a first marginal position, second sensing means for sensing the position of the print head in the "0" percent position, third sensing means for sensing the position of the print head in said "100" percent position for deactivating or reversing the print head motor, means for sensing a plurality of variable analog data signals representing instantaneous values of physical parameters, an analog to digital converter unit for updating said variable analog signals for storing said updated signals, a central processing unit for storing and for tabulating said variable analog data in a memory circuit, said central processing unit subsequentially tabulating said stored signals in order of magnitude and storing said tabulated data in said memory circuit, a motor and a printer control logic for controlling the print head activator and said motor drive circuit, said print head activator controlling the print head for sequentially marking the tabulated variable analog data, as a function of time, and at their value representative of said physical parameters and in their order of magnitude on said sheet material, and a drive motor for driving said sheet material at a constant speed and as a function of time.

20. The recorder of claim 19, wherein said print activator controls energization of a plurality of heating elements in the print head for marking said variable analog data and alpha-numerical indicia on said recording paper.

21. The recorder according to claim 19, wherein said central processing unit scales said variable analog data according to a predetermined mathematical function, and subsequently tabulating said scaled data in said memory circuit.

22. The recorder according to claim 19, including a manual operator interface for manually selecting desired variable analog data and for manually scaling said selected variable analog data according to a mathematical function, and subsequently tabulating said scaled data by order of magnitude in said memory unit.

23. The recorder according to claim 19, wherein said first sensing means on command by the central processing unit activates said print head at the "0" percent position and at a select intermediate percentage position for continuous monitoring of recorder calibration.

* * * * *

UNITED STATES PATENT AND TRADEMARK OFFICE
CERTIFICATE OF CORRECTION

PATENT NO. : 4,074,273
DATED : February 14, 1978
INVENTOR(S) : Wayne P. Dupree; William F. Brown It is certified that error appears in the above-identified patent and that said Letters Patent are hereby corrected as shown below:

Column 2, line 46, delete "valves" and insert
---values---;

Column 3, line 57, delete "squential" and insert
---sequential---;

Column 11, line 51, delete "thermal" and insert
---terminal---.

Signed and Sealed this

Eleventh Day of July 1978

[SEAL]

Attest:

RUTH C. MASON
Attesting Officer

DONALD W. BANNER
Commissioner of Patents and Trademarks